United States Patent
Drewes et al.

(10) Patent No.: US 9,517,657 B2
(45) Date of Patent: Dec. 13, 2016

(54) AXLE LINK COUPLING UNIT

(71) Applicant: SAF-HOLLAND GmbH, Bessenbach (DE)

(72) Inventors: Olaf Drewes, Aschaffenburg (DE); Frederik Biewer, Haibach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 14/424,296

(22) PCT Filed: Sep. 4, 2013

(86) PCT No.: PCT/EP2013/068225
§ 371 (c)(1),
(2) Date: Feb. 26, 2015

(87) PCT Pub. No.: WO2014/040884
PCT Pub. Date: Mar. 20, 2014

(65) Prior Publication Data
US 2015/0321514 A1  Nov. 12, 2015

(30) Foreign Application Priority Data
Sep. 13, 2012  (DE) .......................... 10 2012 216 246

(51) Int. Cl.
*B60B 35/00* (2006.01)
*B60B 35/02* (2006.01)
(Continued)

(52) U.S. Cl.
CPC ................. *B60B 35/02* (2013.01); *B60G 7/00* (2013.01); *B60G 9/003* (2013.01); *B60G 21/051* (2013.01);
(Continued)

(58) Field of Classification Search
CPC ............ B60G 7/00; B60G 3/225; B60G 9/00; B60B 35/163; B60B 35/02; B60B 35/006; B60B 35/00
See application file for complete search history.

(56) References Cited

U.S. PATENT DOCUMENTS 1,982,890 A * 12/1934 Urschel .................. B60B 35/00
301/124.1
2,040,577 A * 5/1936 Urschel .................. B60B 35/02
301/124.1
(Continued)

FOREIGN PATENT DOCUMENTS

DE  69006156  6/1994
DE  10040656  2/2002
(Continued)

OTHER PUBLICATIONS

International Search Report, European Patent Office, Nov. 12, 2013.

*Primary Examiner* — Hau Phan
(74) *Attorney, Agent, or Firm* — Price Heneveld LLP

(57) ABSTRACT

An axle link junction unit includes a base section and an attachment section, the base section comprising a hollow body at least in transitions into the attachment section along an attachment axis, the attachment section non-detachably fixing a support element to the axle link junction unit, wherein a second attachment section is arranged coaxially with respect to the first attachment section and is situated opposite the first attachment section, and wherein a third attachment section extends substantially along a second attachment axis and a fourth attachment section extends substantially along a third attachment.

20 Claims, 6 Drawing Sheets

(51) Int. Cl.
*B60G 7/00* (2006.01)
*B60G 9/00* (2006.01)
*B60G 21/05* (2006.01)

(52) U.S. Cl.
CPC ....... *B60G 2204/43* (2013.01); *B60G 2206/20* (2013.01); *B60G 2206/30* (2013.01)

(56) References Cited

U.S. PATENT DOCUMENTS

| | | | | |
|---|---|---|---|---|
| 2,115,953 | A * | 5/1938 | Hohmeister | F16B 7/0446 403/64 |
| 3,245,491 | A * | 4/1966 | Muller | B60G 3/225 180/358 |
| 4,430,826 | A * | 2/1984 | Ryaa | A63H 33/088 403/64 |
| 5,397,272 | A * | 3/1995 | Smiley | F16C 3/026 138/109 |
| 5,458,359 | A * | 10/1995 | Brandt | B60G 9/00 180/349 |
| 6,367,680 | B1 * | 4/2002 | Duggan | F16C 3/02 228/107 |
| 7,140,969 | B2 * | 11/2006 | Prucher | F16D 3/387 403/57 |
| 7,484,813 | B2 * | 2/2009 | Dantele | B60B 35/006 301/124.1 |
| 7,628,457 | B2 * | 12/2009 | Pochatila | B60B 35/163 180/344 |
| 8,092,310 | B2 * | 1/2012 | Ledford | F16C 21/005 464/128 |
| 8,092,312 | B2 * | 1/2012 | Duncan | F16D 3/387 403/359.5 |
| 2002/0175485 | A1 * | 11/2002 | Tanaka | B60B 27/0047 280/124.125 |
| 2005/0107886 | A1 * | 5/2005 | Crabtree | A61F 2/30744 623/20.24 |
| 2007/0228810 | A1 * | 10/2007 | Pochatila | B60B 35/163 301/132 |
| 2010/0127469 | A1 * | 5/2010 | Quaing | B60G 9/00 280/124.111 |

FOREIGN PATENT DOCUMENTS

| | | |
|---|---|---|
| DE | 10054841 | 5/2002 |
| DE | 20309455 | 8/2003 |
| DE | 10257221 | 6/2004 |
| DE | 102006015671 | 10/2007 |
| DE | 102008000469 | 9/2009 |
| DE | 102008038276 | 2/2010 |
| DE | 102009019320 | 11/2010 |
| EP | 1671821 | 6/2006 |
| EP | 1842700 | 10/2007 |
| WO | 2004054825 | 7/2004 |
| WO | 2005028221 | 3/2005 |
| WO | 2007098927 | 9/2007 |
| WO | 2009053491 | 4/2009 |

* cited by examiner

AXLE LINK COUPLING UNIT

BACKGROUND OF THE INVENTION

The present invention relates to an axle link junction unit for use in the running gear system of a utility vehicle.

Axle link systems of utility vehicles are sufficiently well known from the prior art. Here, in the case of the hitherto known embodiments, the axle link or longitudinal link of a utility vehicle is fixed by means of a clamping connection to the axle body of the utility vehicle, wherein said connection is in most cases reinforced by means of a welded connection produced by thermal welding. In particular, it is the intention for the axle to be connected rotationally conjointly to the axle link by means of this doubly secured connection. It has been found that, owing to the local introduction of heat arising during the thermal welding process, temperature stresses can arise and cause weakening of the microstructure in the axle and in the longitudinal link. As a result, the connecting point between axle body and axle link is one of the main causes of a reduction in service life of the axle system as a whole. Furthermore, the geometrical design of the longitudinal link or axle link is highly complex, and versatile use of the individual axle link components on different running gears of different utility vehicles is in most cases not possible.

It is an object of the present invention to provide an axle link junction unit which makes it easier for the axle link system to be adapted to different utility vehicles and at the same time increases the service life of the axle link system.

SUMMARY OF THE INVENTION

According to the invention, the axle link junction unit comprises a base section and an attachment section, wherein the base section is in the form of a hollow body at least in regions and transitions into the attachment section along an attachment axis, wherein the attachment section is designed for non-detachably fixing a support element, in the form of an axle element or link element, to the axle link junction unit. The axle link junction unit preferably has a second attachment section, and particularly preferably a multiplicity of attachment sections. The base section is particularly preferably designed for absorbing forces and moments from the attachment section, preferably in such a way that local stress peaks are prevented. The support element for fixing to the attachment section is preferably held in position by the base section, that is to say forces can be transmitted from the axle link junction unit to the support element or can be absorbed by said support element. To increase the geometrical moment of inertia of the base section without having to significantly increase the weight of the axle link junction unit, it is provided according to the invention that said base section is in the form of a hollow body at least in regions, wherein, in particular, the capability of said base section for absorbing the moments and transmitting these onward with the least possible material stresses is particularly high. It is preferable for the base section, as part of the running gear of a utility vehicle, to have the lowest possible weight, wherein the smallest possible wall thicknesses, and/or a lightweight construction material, may be preferable. To reach a compromise between high capability for transmitting bending moments and forces and a simultaneously low weight, the geometrical moment of inertia of the base section is increased in particular by virtue of closed, hollow body-like or preferably ring-shaped or elliptical cross sections being formed in different section planes of the base section. It is preferable in particular if the axle link junction unit, in a first state, is designed in particular for simple manufacture or production of the connection between the attachment section and the support element and, in a second state, is designed in particular for optimum transmission of forces and/or moments between the attachment section and the base section. In the first state, the axle link junction unit correspondingly preferably has circular or simple square or rectangular cross-sectional profiles which make it easier to realize extremely simple production of further components for fixing on the axle link junction unit and also the production of the axle link junction unit itself. In the second state, the axle link junction unit has a cross-sectional profile which is optimized with regard to transmission of forces and/or bending moments in particular along selected axes and directions, said cross-sectional profile particularly preferably deviating from the circular or rectangular shape. The axle link junction unit, in particular the attachment section, is particularly preferably designed for receiving and fixing a support element by means of an adhesive connection. That surface of the attachment section which corresponds with the contact surface of the support element is preferably realized with a surface quality which permits particularly high adhesion and cohesion values in the production of an adhesive connection. It is furthermore preferably possible for different, preferably cohesive, connection methods to be used for a multiplicity of support elements for fixing to the axle link junction unit. In this case, it is particularly preferable for a support element which transmits relatively high forces to be fixed by way of friction welding, whereas a support element which transmits only low forces is to be fixed by way of an adhesive connection. In this way, the manufacturing outlay can be kept as low as possible, because the selected attachment method can be optimally adapted to the forces to be transmitted.

The attachment section preferably has an outwardly facing abutment surface which preferably serves for the abutment of the support element. In this context, "outwardly facing" defines that side of the attachment section which faces away from the base section. The outwardly facing abutment surface of the attachment section may particularly preferably serve as a contact surface of the attachment section with a support element for the formation of a friction-welded connection. It is furthermore preferably possible for the outwardly facing abutment surface of the support element to also serve, by positively locking action, for preventing displacement relative to the axle link junction unit or relative to the attachment section of the axle link junction unit toward the base section or in the direction of the base section. It is self-evident that the support element which is to be attached to the attachment section preferably has a support element-side abutment surface which corresponds to the abutment surface of the attachment section. The abutment surface of the attachment section is preferably of planar form, that is to say is preferably the face surface of an annular cylinder or of a tube, a shell surface section of a disk segment of a cylinder, or for example a rounded surface cutout of a spherical element. The abutment surface of the attachment section is in this case preferably planar along a direction running in a plane arranged perpendicular to the attachment axis. In other words, this means that a section through the abutment surface of the attachment section in a plane perpendicular to the attachment axis has a continuous or linear section edge profile of the section outline in said plane.

It may alternatively be preferable for the attachment section to have a multiplicity of outwardly facing abutment surfaces, wherein said abutment surfaces may particularly preferably be arranged offset with respect to one another along the attachment axis. In this way, it is preferably possible for a multiplicity of friction-welding surfaces, arranged offset with respect to one another along the attachment axis, to be formed between attachment section and support element, by means of which friction-welding surfaces the assembly composed of axle link junction unit and support element can transmit higher moments because a lever arm between the two attachment sections reduces the moments and stresses arising in the respective contact surfaces.

In a particularly preferred embodiment, in a first state of the axle link junction unit, the outwardly facing abutment surface is of rotationally symmetrical form about the attachment axis. The rotationally symmetrical form of the outwardly facing abutment surface is advantageously suitable and designed for serving as a contact surface for a friction welding process, particularly preferably a rotary friction welding process. The outwardly facing abutment surface may in this case have, transversely with respect to the attachment axis, a cross-sectional profile which varies in the direction of the attachment axis, wherein the rotational symmetry of the outwardly facing abutment surface is however preferably maintained. In this way, it is possible for the actual contact surface, provided for a particular annular area, for a friction welding process to be enlarged for example by means of projections and recesses, grooves or rounded portions, or to be adapted to particular surface geometries of a support element to be mounted on the first abutment surface. The outwardly facing abutment surface is preferably deformed jointly with the axle link junction unit, and the attachment sections thereof, in the second state to form a geometry which need not imperatively be rotationally symmetrical.

It is furthermore preferable if the attachment section has an inwardly facing abutment surface which, in a second state of the support element, serves for the insetting of the support element. The inwardly facing abutment surface which thus faces toward the base section of the axle link junction unit serves, similarly to the outwardly facing abutment surface, for the abutment of a corresponding counterpart geometry of the support element. It is preferable here for the inwardly facing abutment surface to be designed to form, with the corresponding counterpart geometry of the support element, an undercut which secures the support element so as to prevent it from being displaced relative to the axle link junction unit in the direction pointing away from the base section. In this connection, a first state of the support element is preferably defined as being a state in which the support element can be inserted into the attachment section of the axle link junction unit in order to subsequently be deformed such that the support element has a corresponding counterpart geometry with respect to the inwardly facing abutment surface of the axle link junction unit or of the attachment section, said corresponding counterpart geometry securing the support element in positively locking fashion so as to prevent it from being displaced relative to the axle link junction unit in the direction pointing away from the base section of the axle link junction unit.

The attachment section preferably has a projection and/or a recess, preferably a multiplicity of projections and/or recesses, transversely with respect to the attachment axis in order to fix the support element in positively locking fashion to the axle link junction unit. The projection and/or recess of the attachment section extends in this case at least perpendicular to the attachment axis and may particularly preferably be formed as an individual projection which protrudes into the attachment section or out of the attachment section, or as an encircling projection or recess. The support element is advantageously designed such that, in a first state, it can be inserted into the attachment section or mounted onto the attachment section past the projection or recess, and in a second state, it is deformed such that a corresponding counterpart geometry of the support element forms an undercut with the projection and/or recess that is preferably provided, thus fixing the support element to the attachment section of the axle link junction unit in positively locking fashion. In this context, an internal high-pressure deformation process is expedient as a deformation process for bringing the support element from the first state into the second state. The projection or recess of the attachment section advantageously has rounded edges or faces or surfaces in order that notch effects are avoided during a deformation of the material of the support element on the projection or recess.

It is furthermore preferable for the axle link junction unit to be formed from two half-shells. To simplify the production of the axle link junction unit, the latter may preferably be produced from two half-shells which are for example formed as semi-finished parts. The half-shells themselves may preferably be produced by a deformation process, such as for example deep drawing or die forging, and subsequently welded to one another. It is possible in this way, in particular by comparison with production by means of a casting process, to lower the production costs for the axle link junction unit and increase production speed. To join the half-shells together to form the axle link junction unit, use may preferably be made of a welding process such as vibrational friction welding, in which the parts are kept in oscillating motion relative to one another and are simultaneously pressed against one another, or a thermal welding process such as arc welding or gas fusion welding.

The axle link junction unit preferably has, in a first state, a first support section, wherein, in the first and/or second state of the axle link junction unit, the first support section is preferably in the form of an attachment region for a pneumatic spring of a utility vehicle. In other words, the attachment region for a pneumatic spring of a utility vehicle is formed integrally with the axle link junction unit during a casting process, for example, and does not need to be fixed to the axle link junction unit by means of a welding process or similar process. In particular for applications in which it is intended to use an axle link junction unit with a particular geometric design for a series of utility vehicles that use the same pneumatic spring system, it may be expedient for the pneumatic spring holder or the attachment region for the pneumatic spring of a utility vehicle to be arranged integrally on the axle link junction unit. In this case, it is possible for the first support section or the attachment region for the pneumatic spring to be configured, in a first state of the axle link junction unit, as a simple geometry, for example as a tube, and to be deformed, in a second state, support section adapted to the corresponding loading and the corresponding connection geometries of the pneumatic spring. It is particularly preferably the case that the first support section, in the second state, is flattened and formed with a large contact region or holding region for a pneumatic spring element known from the prior art.

Alternatively or in addition to a first support section, it is preferably possible for further elements, such as for example an axle stub section or a second support section, to be provided integrally on the axle link junction unit. The axle stub section is in this case preferably formed coaxially and/or rotationally symmetrical or parallel to the main axis of extent of the axle of the utility vehicle, to which in turn the axle link junction unit can be fixed. In other words, it is preferable for the axle stub section to extend along the first attachment axis or along a direction running parallel to the first attachment axis. The second support section serves preferably for the fixing of further running gear elements to the axle link junction unit. For example, a shock-absorbing damper or vibration damper of the running gear system of the utility vehicle can be fixed directly by way of the second support section to the axle link junction unit. It is furthermore preferably possible for a brake carrier to be fixed to the axle link junction unit by way of the second support section. By means of the arrangement of one or multiple second support section(s) on the axle link junction unit, the compactness of the running gear system can be increased, and weight and structural space can be reduced at the same time.

In a particularly preferred embodiment, a second attachment section is arranged coaxially with respect to the first attachment section and so as to be situated opposite said first attachment section, wherein the two attachment sections preferably extend along a first attachment axis. Here, the first and second attachment sections are preferably designed for the fixing of an axle tube and an axle stub of a utility vehicle. Furthermore, a third attachment section, which extends substantially along a second attachment axis, and a fourth attachment section, which extends substantially along a third attachment axis, are preferably provided, wherein the first attachment axis is preferably perpendicular to the second and third attachment axes, wherein the third and fourth attachment sections are preferably designed for the fixing of elements of a longitudinal link or of an axle link. In other words, in this preferred embodiment, the axle link junction unit has at least two, preferably four attachment sections, two of which preferably serve for the fixing of the rigid axle or the steering axle of an axle link junction unit and/or the axle stub to the axle link junction unit, and a further two of which serve for the attachment of elements of a longitudinal or axle link of the utility vehicle. The first, second and third attachment axes are in this case preferably the axes along which the respective support elements are fixed to the respective attachment sections. For a preferred rotationally symmetrical form of the attachment sections, these are thus particularly preferably formed rotationally symmetrically about the respective attachment axis. The different attachment axes may in this case be arranged offset with respect to one another depending on the geometry of the axle link junction unit, and need not imperatively have a point of intersection with one another. This embodiment of an axle link junction unit with at least two attachment sections is advantageous because, with little manufacturing outlay, it is possible to produce a link unit for a utility vehicle which is composed of individual parts of modular form.

It is preferable if, in a plane perpendicular to the first attachment axis, the second attachment axis and the third attachment axis preferably enclose an angle which lies between 90° and 270°, preferably between 135° and 225°, and which is particularly preferably approximately 160° to 220°. The second and third attachment axes are preferably in each case the two directions along which the elements of a link element are fixed to the axle link junction unit, and it has been found that the structural space of the running gear system can be better utilized if the second and third attachment axes enclose an angle which preferably lies between 90° and 270°. In the event that the second and third attachment axes do not have a point of intersection with one another, that is to say run offset with respect to one another along an axis perpendicular to the two axes, the angle is particularly preferably measured between the projections of the second and third attachment axes onto a plane perpendicular to an axis which for its part in turn is perpendicular to the second and third attachment axes. The preferred angle range makes it advantageously possible to realize low ride heights, that is to say an extremely small spacing between the ground and the frame of the utility vehicle, with an axle link junction unit according to the invention.

It is furthermore preferable if the third attachment section has an extent perpendicular to the second attachment axis which is in a ratio from 0.7 to 1.5, preferably from 0.9 to 1.4, and particularly preferably of approximately 1.1 to 1.3, with respect to the extent of the first attachment section perpendicular to the first attachment axis. The greater the extent of the respective attachment section perpendicular to the attachment axis passing through it is, the greater is the geometrical moment of inertia while maintaining the same wall thicknesses of the attachment section. It is preferable if the first attachment section, which preferably faces toward the abutment of the rigid axle or of the steering axle of the utility vehicle, has an extent smaller than the extent of the third attachment section perpendicular to the second attachment axis. To the third attachment section there is preferably fixed an element of a longitudinal link, for example a support device of a pneumatic spring or a lever device for the pivotable mounting of the link element on the bearing block of a utility vehicle running gear.

It may furthermore be preferable if the second attachment section has an extend perpendicular to the first attachment axis which is in a ratio from 0.7 to 1.5, preferably from 0.9 to 1.4, and particularly preferably of approximately 1.1 to 1.3, with respect to the extent of the first attachment section perpendicular to the first attachment axis. It is particularly preferable for the axle stub of a utility vehicle wheel suspension arrangement to be fixed to the second attachment section, wherein the connection of the axle stub to the axle link junction unit must exhibit higher strength than the connection of the axle body to the axle link junction unit at the first attachment section. Owing to this, it is preferable for the extent of the second attachment section to be greater than the extent of the first attachment section perpendicular to the first attachment axis. In this way, the geometrical moment of inertia of the attachment section of the axle stub to the axle link junction unit is configured so as to be greater than the geometrical moment of inertia of the attachment section of the axle link junction unit to the axle body or the steering axle of the utility vehicle.

In a particularly preferred embodiment, in a second state of the axle link junction unit, the attachment section and the base section have a cross section which deviates from a circular shape. In the second state, the axle link junction unit is preferably designed for optimum transmission of forces and moments between the individual running gear elements, fixed thereto, of the utility vehicle. It is correspondingly preferable for the geometric design of the different attachment elements to also be adapted to the respectively prevailing main force directions or main moment directions. Polygonal cross sections, cross sections provided with rounded portions, or elliptical or parabolic cross sections of the attachment sections of the axle link junction unit to the respective support elements are therefore preferable.

Further advantages and features of the invention will emerge from the following description with reference to the appended figures. Individual features of the embodiments shown in the figures may in this case be combined with one another within the scope of the invention.

DETAILED DESCRIPTION OF THE PREFERRED EMBODIMENTS

Figure 1A:
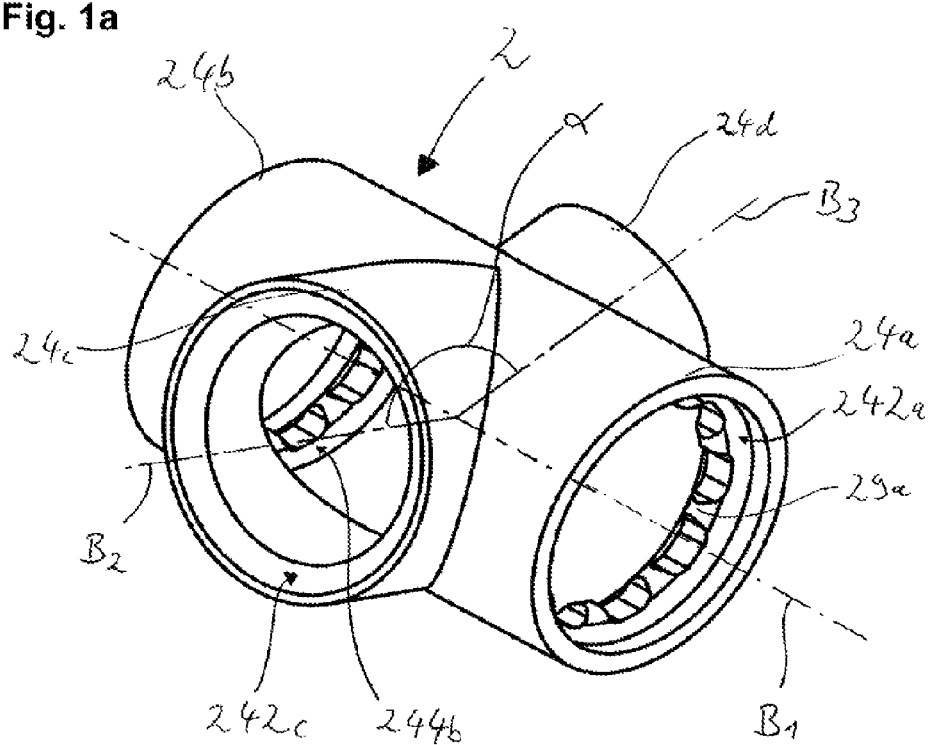
FIGS. 1a-c show three views of a preferred embodiment of the axle link junction unit according to the invention.
Figure 1B:
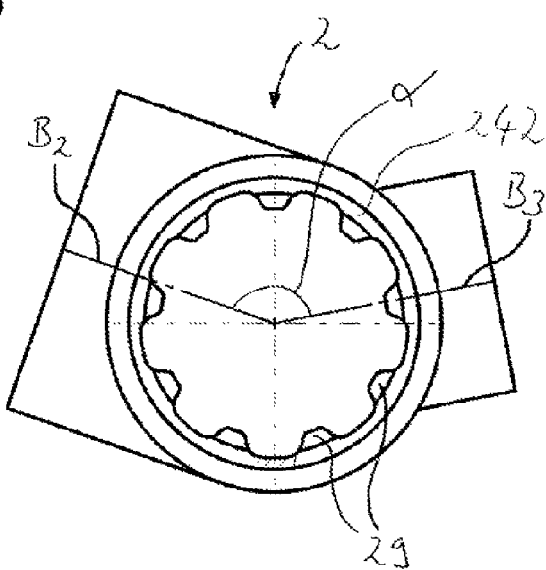
Figure 1C:
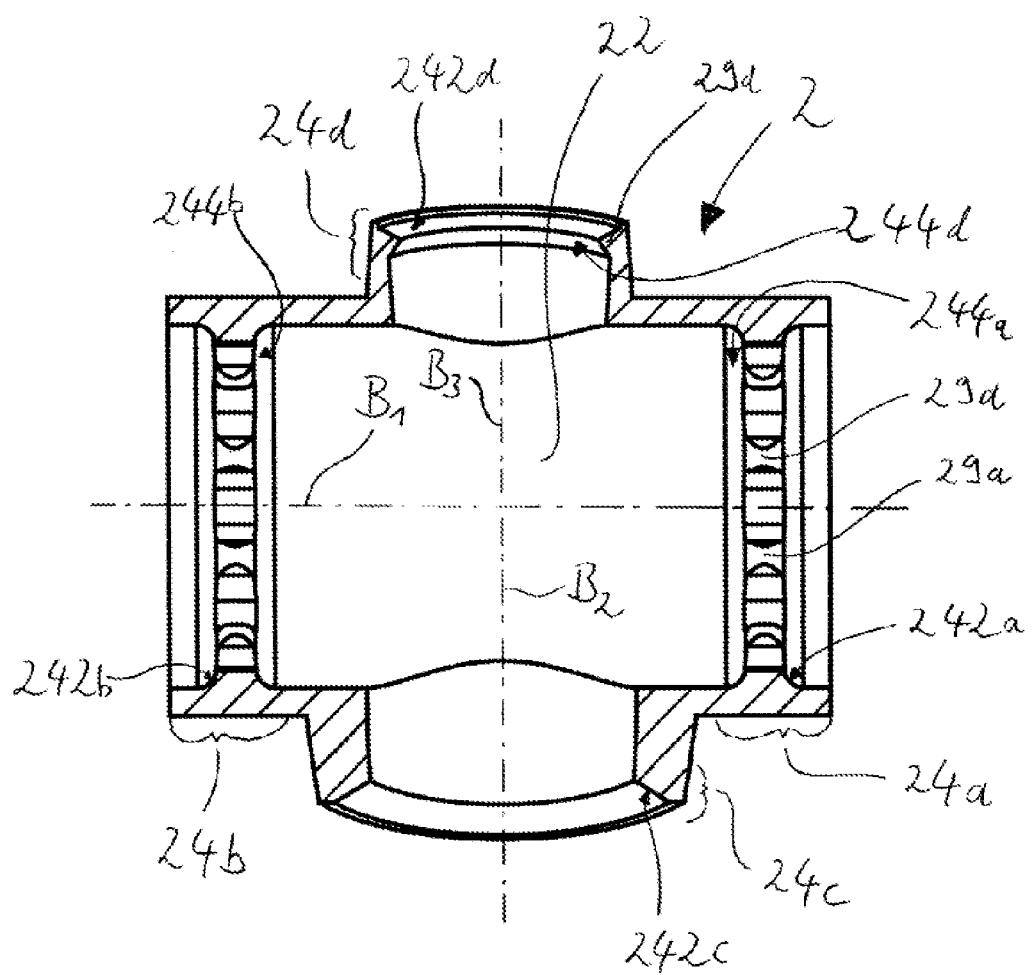

FIGS. 1a, 1b and 1c show different views of a first preferred embodiment of the axle link junction unit 2 according to the invention. It can be seen from the perspective view in FIG. 1a that the axle link junction unit has two, preferably four, attachment sections 24a, 24b, 24c and 24d. Below, geometries assigned to respective individual attachment sections, such as for example the abutment surface 242, will be assigned to one of the corresponding attachment sections 24 (a-d, . . . ) by way of the respectively corresponding letters a, b, c, . . . . The first attachment section 24a and the second attachment section 24b are preferably of rotationally symmetrical form, or substantially rotationally symmetrical form, about the first attachment axis $B_1$. The third attachment section 24c is of substantially rotationally symmetrical form about the second attachment axis $B_2$, and the fourth attachment section 24d is preferably of rotationally symmetrical form about the third attachment axis $B_3$. As illustrated in FIG. 1a, projections 29 (a-d) may be provided on the respective attachment sections 24 (a-d), wherein said projections need not imperatively be of continuous form, that is to say of annular form, about the respective attachment axis B, but instead may be in the form of teeth or lugs, for example, as illustrated in the figure. In this way, it can be achieved that, by positively locking fixing of a support element for fixing to the axle link junction unit, both a rotation about the respective attachment axis B and also a displacement along the respective attachment axis B relative to the attachment section 24 (a-d) are achieved. The attachment sections 24 each have an outwardly facing abutment surface 242 (a-d), wherein, in the perspective view that is illustrated, the second and fourth abutment surfaces 242b and 242d are hidden. It is furthermore preferable for a multiplicity of individual abutment surfaces 242, which protrude inward or outward in the manner of teeth, to be provided on the respective attachment section 24. The second attachment axis $B_2$ and the third attachment axis $B_3$ are preferably not oriented collinearly or parallel with respect to one another, but instead form, in a plane perpendicular to the attachment axis $B_1$, an angle α which preferably lies in a range between 90° and 270° and is particularly preferably less than 180°. The angle α can in this case be particularly clearly seen in the side view of the axle link junction unit 2 according to the invention shown in FIG. 1b. The sectional view of the preferred embodiment of the axle link junction unit 2 shown in FIG. 1c shows in particular the preferred profile of the wall thicknesses of the individual attachment sections 24 (a-d), wherein it is for example particular preferable for the third attachment section 24c to have a greater wall thickness than the fourth attachment section 24d. Here, the wall thickness is particularly preferably measured as the extent of the material or of the respective walls of the axle link junction unit perpendicular to the attachment axes $B_1$ and $B_2$ and $B_3$ respectively. The sectional view in FIG. 1c shows the preferred embodiment, in which one of the attachment sections 24, in the selected example the attachment section 24d, has an outwardly facing abutment surface 242d and an inwardly facing abutment surface 244d. The inwardly facing abutment surface 244 and the outwardly facing abutment surface 242 particularly preferably serve for the positively locking fixing of a support element which is inserted into the attachment section 24 and subsequently deformed. The fourth attachment section 24d thus has a projection 29d which protrudes inwardly in annular form and which runs rotationally symmetrically about the third attachment axis $B_3$. At the first attachment section 24a and at the second attachment section 24b, there is shown a design which may alternatively also be used for the other attachment sections 24c, 24d, in the case of which design there are provided projections 29a and 29b, respectively, which protrude inward in the manner of teeth and which particularly preferably have rounded geometries in order to prevent notch effects on a deformed support element. It is self-evident that a projection 29 extending perpendicular to the corresponding attachment axis B in each case preferably has an inwardly facing and an outwardly facing abutment surface 244, 242. It is furthermore preferable for the first attachment section 24a and the second attachment section 24b to have the same extent and the same form relative to the first attachment axis $B_1$ and to be designed in each case coaxially with respect to one another and with respect to the first attachment axis $B_1$. In this way, it is made possible in a particularly simple manner for a tubular support element, for example the axle body of a vehicle axle with axle stub provided integrally therewith, to be passed through the axle link junction unit 2 and subsequently inflated by means of an internal high-pressure deformation process and pressed against the internal walls of the base section 22 and of the attachment sections 24a and 24b, and for positive locking to be produced between the axle link junction unit 2 and the support element in this way. In the embodiment illustrated, the third attachment section 24c is designed to be particularly well-suited for the fixing of a support element by means of a friction welding process. The outwardly facing abutment surface 242c is in this case preferably an annular segment of a shell surface of a cone. The respective outwardly protruding abutment surfaces 242 (a-d) could furthermore preferably each also be oriented perpendicular to the respective attachment axis $B_{1\ldots 3}$.

Figure 2:
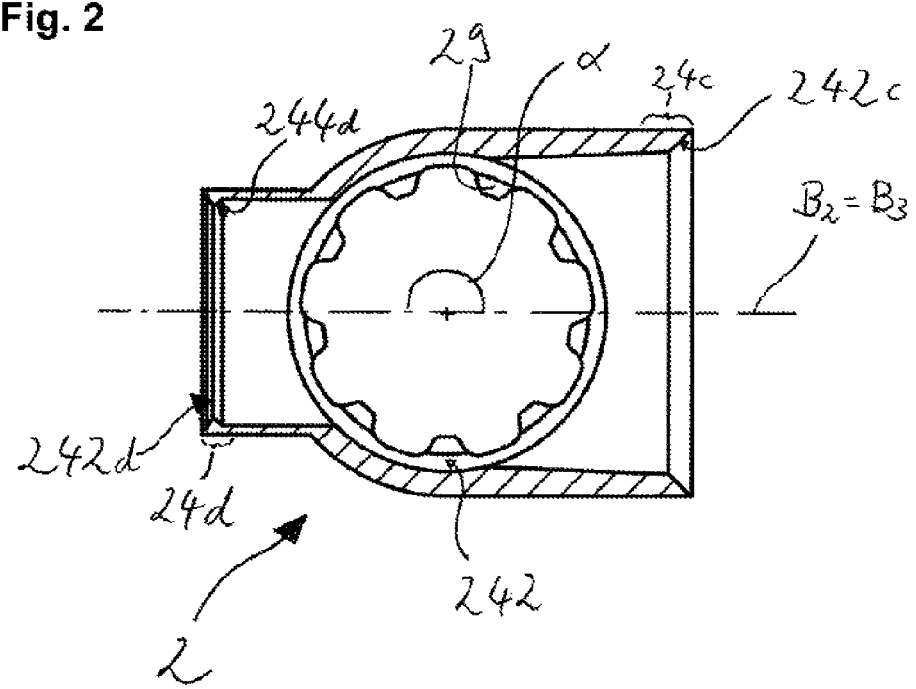
FIG. 2 shows a sectional view of a preferred embodiment of the axle link junction unit according to the invention.

FIG. 2 shows a preferred embodiment of the axle link junction unit 2 according to the invention, in which the second attachment axis $B_2$ is oriented collinearly or parallel with respect to the third attachment axis $B_3$. In this embodiment, the angle α spanned between the attachment axes $B_2$ and $B_3$ is accordingly 180°.

Figure 3:
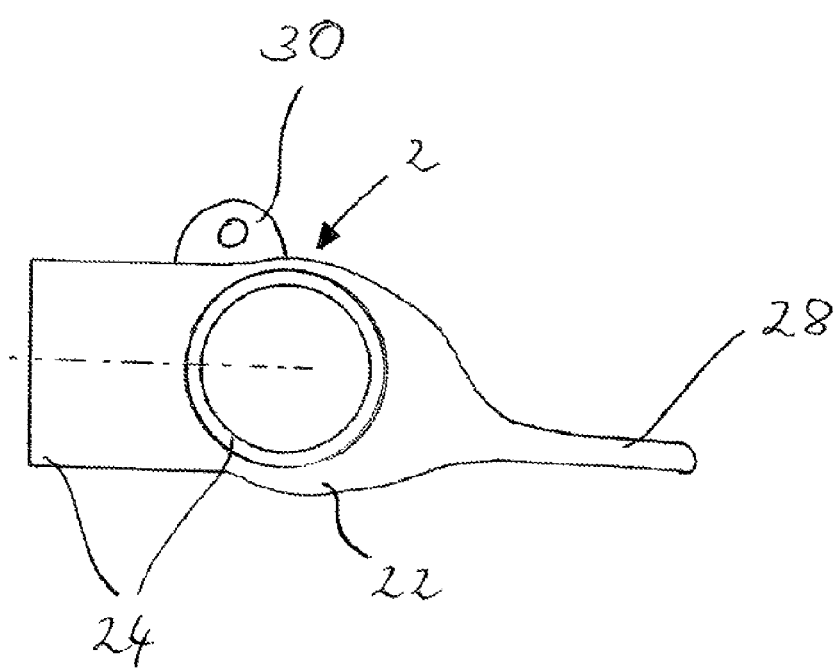
FIG. 3 shows a side view of a preferred embodiment of the axle link junction unit according to the invention with integrally formed support section, FIGS. 4a, b show two views of a preferred embodiment of the axle link junction unit according to the invention in the second state.

FIG. 3 shows a side view of a preferred embodiment of the axle link junction unit according to the invention, in which a first support section 28 and/or a second support section 30 are formed integrally with the body or with the base section 22 of the axle link junction unit 2. In this case, the first support section 28 is preferably designed as a retention section or support section for the mounting of a pneumatic spring on the axle link junction unit 2. The second support section 30 may for example, as shown, be in the form of an eyelet or a web which, for example, has a cutout by means of which a shock-absorbing damper or vibration damper of the running gear system of the utility vehicle can be fixed directly to the axle link junction unit 2 by way of a bolt. Also shown in the figure are two further attachment sections 24, one of which protrudes toward the left in the figure, and one of which protrudes from the base section 22 of the axle link junction unit 2 toward the viewer.

Figure 4A:
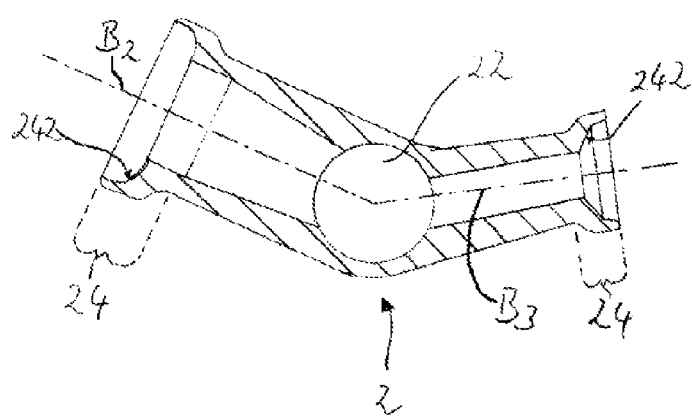
Figure 4B:
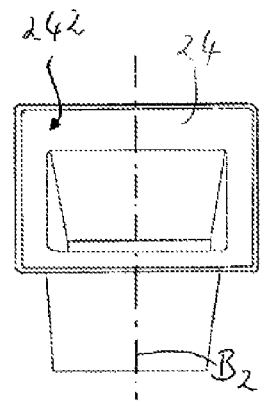

In the preferred embodiment shown in FIGS. 4a and 4b, the attachment sections 24, preferably in their second state, have a geometry which deviates from the circular form. The figure shows, by way of example, a rectangular form of the respective attachment section 24. For the preferred situation that a support element is to be fixed to the axle link junction unit by way of a deformation process, assisted for example by an adhesive connection or a soldered connection, the axle link junction unit may already have this rectangular cross section in its initial state. It may alternatively preferably be provided that, in its first state, the axle link junction unit 2 has attachment sections 24 which are preferably of circular form, to which attachment sections a support element is fixed, whereafter subsequently axle link junction unit 2 and support element are jointly deformed so as to form rectangular or rounded rectangular cross sections. It is alternatively also preferable for an elliptical oval or polygonal cross section to be provided, instead of the rectangular cross section, for the attachment sections 24 or parts of the base section 22 of the axle link junction unit 2. It is furthermore preferable for only some of the attachment sections 24 to have a cross section which deviates from a circular form, whereas the respective other attachment sections remain circular both in the first state and in the second state of the axle link junction unit 2.

Figure 5:
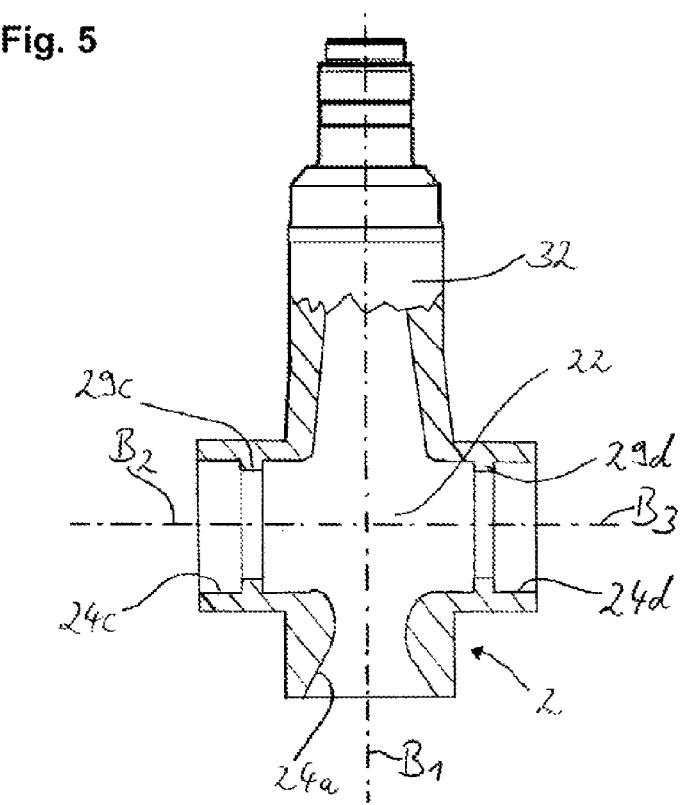
FIG. 5 shows a sectional view of a preferred embodiment of the axle link junction unit according to the invention.

FIG. 5 shows a preferred embodiment of the axle link junction unit 2 according to the invention, in the case of which, instead of an attachment section situated opposite the first attachment section 24a, an axle stub element 32 is formed integrally with the axle link junction unit 2. In other words, in this embodiment, the base section 22 comprises a region formed as an axle stub of the vehicle axle of a utility vehicle. In this case, the first attachment section 24a has a geometry which is preferably similar to that of a de Laval nozzle and which is designed for the fixing of a support element by means of a friction welding process or of a support element which is connected in positively locking fashion to the first attachment section 24a. It is furthermore preferable for the third and fourth attachment sections 24c and 24d to have an identical cross-sectional design, such that, for example, a link element can be pushed all the way through the axle link junction unit 2 and subsequently fixed both to the attachment sections 24c and 24d and to the internal surfaces of the base section 22 by means of an internal high-pressure deformation process, preferably assisted by an adhesive connection or a soldered connection.

Figure 6:
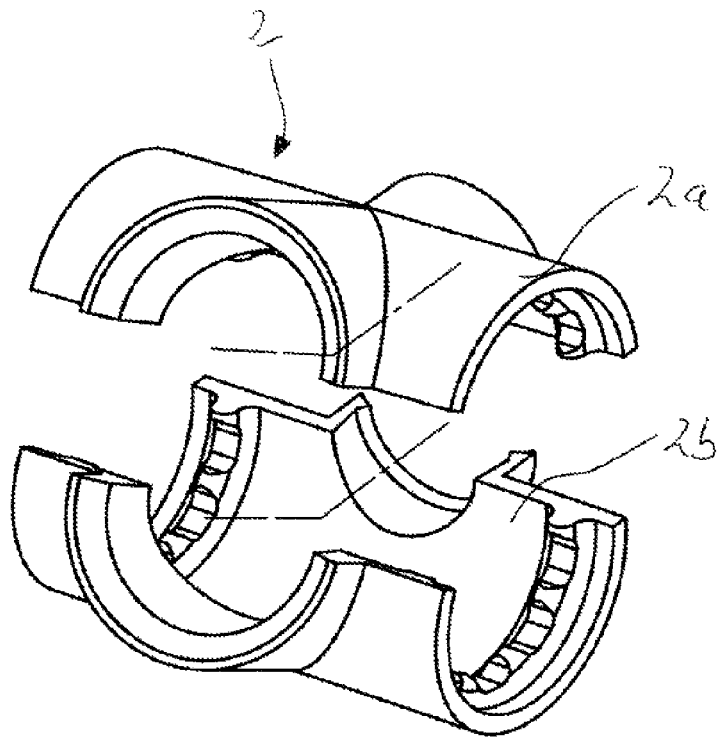
FIG. 6 shows a perspective view of two half-shells suitable for forming an axle link junction unit.

FIG. 6 shows a particularly preferred embodiment in which the axle link junction unit 2 is formed from two half-shells 24a and 24b. The production of the axle link junction unit 2 from two half-shells 2a and 2b has the advantage that particularly inexpensive and time-saving production methods can be used. Accordingly, it is preferable for the respective half-shells 2a, 2b to be produced by die forging or by a deep-drawing process, and to subsequently be welded or adhesively bonded to form an axle link junction unit 2. The parting surface of the axle link junction unit into the respective half-shells is in this case preferably configured so as to permit expedient production through the avoidance of undercuts.

Figure 7:
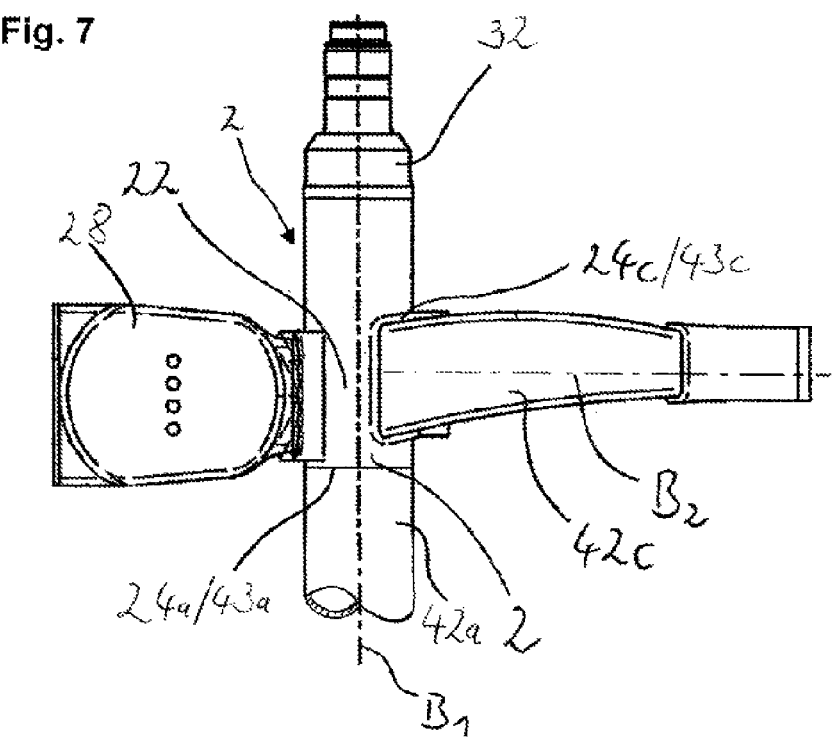
FIG. 7 shows a view of a preferred embodiment of the axle link junction unit according to the invention.

FIG. 7 shows a plan view of a preferred embodiment of the axle link junction unit 2 according to the invention, which in its second state is integrated into an axle system of a utility vehicle. Here, it is preferably the case that, instead of the second attachment section, an axle stub element 32 is formed integrally with the base section 22 of the axle link junction unit 2 and, instead of the fourth attachment section, a pneumatic spring holder or a first support section 28 is formed integrally with the base section 22 of the axle link junction unit 2. The axle body 42a shown at the bottom in the figure is preferably fixed by way of its attachment region 43a to the axle link junction unit 2, or to the first attachment section 24a of the axle link junction unit 2, preferably by way of a rotary friction welding process at the face side. That section of a link element 42c which is shown on the right in the figure is preferably fixed by way of its attachment region 43c to the axle link junction unit 2 or to the third attachment section 24c of the axle link junction unit 2 in positively locking fashion by way of an internal high-pressure deformation process. This embodiment combines, by way of example, the preferred embodiments for the various components provided on the axle link junction unit. It is self-evident that the respective methods of friction welding, deformation or internal high-pressure deformation, or integral formation of the components with the axle link junction unit may also be applied to attachment sections 24a-d, and preferably further attachment sections 24, other than those respectively shown here.

Figure 8:
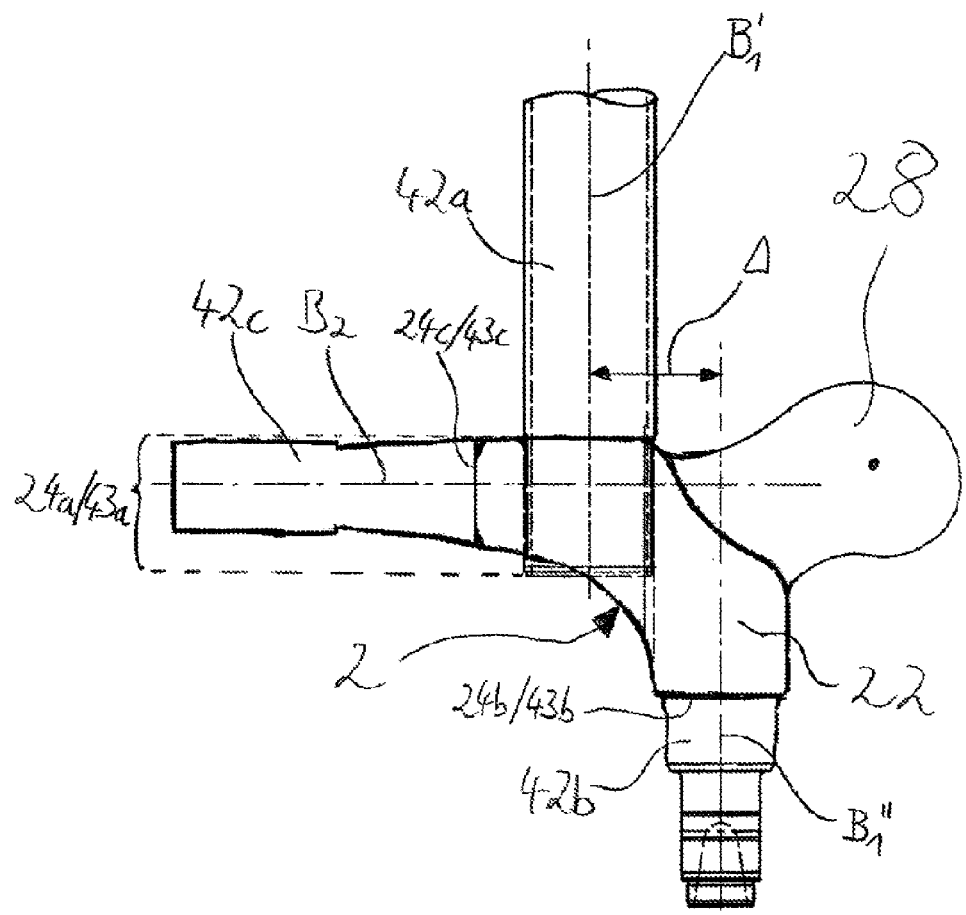
FIG. 8 shows a view of a further preferred embodiment of the axle link junction unit according to the invention.

FIG. 8 shows a plan view of a further preferred embodiment of the axle link junction unit 2 according to the invention, which in its second state is integrated into an axle system of a utility vehicle. Here, it is preferably the case that, instead of the first attachment axis, a first parallel axis $B_1'$ is provided, along which the first attachment section 24a extends and along which the first support element 42a is fixed, in its first attachment region 43a, to the axle link junction unit 2. The first support element 42a is preferably the axle tube of a utility vehicle. The second attachment section 24b is preferably arranged such that a second support element 42b can be fixed, in its second attachment region 43b, to the axle link junction unit 2 along a second parallel axis $B_1''$. The second support element 42b is preferably the axle stub of a wheel suspension arrangement of a utility vehicle running gear. The first parallel axis $B_1'$ is particularly preferably oriented parallel to the second parallel axis $B_1''$. The first parallel axis $B_1'$ is particularly preferably arranged so as to be offset from the second parallel axis $B_1''$ by a spacing $\Delta$. In this case, the spacing $\Delta$ is preferably 0.2-1.3 times, particular preferably 0.3 to 0.9 times, the diameter of the axle tube. By means of the preferred spacing of the first parallel axis $B_1'$ from the second parallel axis $B_1''$, particularly good adaptation of the axle link junction unit 2 to different utility vehicle types is possible, whereby the axle link junction unit 2 can be used in a more versatile manner than conventional axle systems. A third support element 42c is fixed, at a third attachment section 24c, to the axle link junction unit preferably along a second attachment axis $B_2$. Instead of the fourth attachment section, it is particularly preferably the case that a pneumatic spring holder or a first support section 28 is formed integrally with the base section 22 of the axle link junction unit 2. The second support element 42b shown at the bottom in the figure is preferably fixed by way of its attachment region 43b to the axle link junction unit 2 or to the second attachment section 24b of the axle link junction unit 2 by way of a rotary friction welding process at the face side. The axle body 42a shown at the top in the figure is preferably fixed by way of its attachment region 43a to the axle link junction unit 2 or to the first attachment section 24a of the axle link junction unit 2 by means of an internal high-pressure deformation process. Owing to the possibility of selecting adhesive bonding, friction welding and/or internal high-pressure deformation as the attachment process for the attachment of the individual support elements 24a, 24b, 24c to the axle link junction unit 2 in a manner dependent on load, particularly good adaptation of the axle link junction unit, and of the axle system produced therewith, to the forces and moments to be transmitted is possible.

LIST OF REFERENCE SIGNS

2—Axle link junction unit
2(a, b)—Half-shell
22—Base section
24(a . . . d)—Attachment section
28—First support region
29(a . . . d)—Projection
30—Second support region
32—Axle stub element
42a—First support element, or axle body
42b—Second support element, or axle stub
42c—Support element, or link element
43(a, c)—Attachment region
242(a . . . d)—External abutment surface
244(a . . . d)—Internal abutment surface
$B_{1...3}$—Attachment axis
$B_1'$—First parallel axis
$B_1''$—Second parallel axis
α—Angle
Δ—Spacing

The invention claimed is:

1. An axle link junction unit for use in utility vehicles, comprising:
    a base section; and
    an attachment section;
    wherein the base section is formed at least partially as a hollow body and transitions into the attachment section along an attachment axis;
    wherein the attachment section non-detachably fixes a support element to the axle link junction unit, wherein the support element comprises at least one of an axle element and a link element;
    wherein a second attachment section is arranged coaxially with respect to the first attachment section and is situated opposite the first attachment section; and
    wherein a third attachment section extends substantially along a second attachment axis and a fourth attachment section extends substantially along a third attachment axis; and
    wherein the attachment section has an outwardly facing abutment surface configured to abut the support element.

2. The axle link junction unit of claim 1, wherein the attachment section includes a multiplicity of outwardly facing abutment surfaces, and wherein the abutment surfaces are arranged offset with respect to one another along the attachment axis.

3. The axle link junction unit of claim 1, wherein, in a first state of the axle link junction unit, the outwardly facing abutment surface is rotationally symmetrical about the attachment axis.

4. The axle link junction unit of claim 1, wherein the attachment section includes an inwardly facing abutment surface which, in a second state of the support element is configured to abut the support element.

5. The axle link junction unit of claim 1, wherein the attachment section includes at least one of a projection and a recess transverse with respect to the attachment axis that positively locks the support element to the axle link junction unit.

6. The axle link junction unit of claim 1, further comprising:
    having a first support section, wherein, in a first and/or second state of the axle link junction unit, the first support section comprises an attachment region for a pneumatic spring of a utility vehicle.

7. The axle link junction unit of claim 1, wherein the axle link junction unit comprises two half-shells.

8. The axle link junction unit of claim 1, wherein the second attachment section extends along a first attachment axis, and wherein the first and second attachment sections are configured to fix an axle tube and an axle stub of a utility vehicle.

9. The axle link junction unit of claim 8, wherein the first attachment axis is substantially perpendicular to the second and third attachment axes, and wherein the third and fourth attachment sections are configured to fix elements of a longitudinal link.

10. The axle link junction unit of claim 9, wherein an angle between the second attachment axis and the third attachment axis is between 90° and 270°.

11. The axle link junction unit of claim 10, wherein the angle between the second attachment axis and the third attachment axis is between 135° and 225°.

12. The axle link junction unit of claim 11, wherein the angle between the second attachment axis and the third attachment axis is between 160° and 220°.

13. The axle link junction unit of claim 9, wherein the first attachment section has an extent perpendicular to the first attachment axis that is in a first ratio from 0.7 to 1.5.

14. The axle link junction unit of claim 13, wherein the first ratio is from 0.9 to 1.4.

15. The axle link junction unit of claim 14, wherein the first ratio is from 1.1 to 1.3.

16. The axle link junction unit of claim 9, wherein the second attachment section has an extent perpendicular to the first attachment axis that is in a second ratio from 0.7 to 1.5.

17. The axle link junction unit of claim 16, wherein the second ratio is from 0.09 to 1.4.

18. The axle link junction unit of claim 17, wherein the second ratio is from 1.1 to 1.3.

19. The axle link junction unit of claim 1, wherein, in a second state of the axle link junction unit, the attachment section and the base section have a polygonal cross section.

20. The axle link junction unit of claim 19, wherein the attachment section and the base section have a rectangular cross section.

* * * * *

UNITED STATES PATENT AND TRADEMARK OFFICE
CERTIFICATE OF CORRECTION

PATENT NO. : 9,517,657 B2
APPLICATION NO. : 14/424296
DATED : December 13, 2016
INVENTOR(S) : Drewes et al.

Page 1 of 1

It is certified that error appears in the above-identified patent and that said Letters Patent is hereby corrected as shown below:

In the Specification

Column 6, Line 32:
"extend" should be — extent —

Column 8, Line 9:
"particular" should be — particularly —

Column 8, Line 20:
"244 . . 242" should be — 244d . . . 242d —

Column 10, Line 56:
"particular" should be — particularly —

In the Claims

Column 11, Claim 1, Line 55:
Delete "and"

Column 12, Claim 4, Line 10:
After "element" insert -- , --

Column 12, Claim 17, Line 55:
"0.09" should be — 0.9 —

Signed and Sealed this
Twenty-seventh Day of March, 2018

Andrei Iancu
*Director of the United States Patent and Trademark Office*